(12) United States Patent
Nguyen et al.

(10) Patent No.: US 10,131,004 B1
(45) Date of Patent: Nov. 20, 2018

(54) CUTTING INSERT HAVING NON-IDENTICAL RECTANGULAR END SURFACES WITH RAISED AND LOWERED CORNER PORTIONS AND CUTTING TOOL

(71) Applicant: Ingersoll Cutting Tool Company, Rockford, IL (US)

(72) Inventors: Eric William Nguyen, South Beloit, IL (US); William B. Johnson, Machesney Park, IL (US); Dennis Etienne Roepsch, Cherry Valley, IL (US)

(73) Assignee: Ingersoll Cutting Tool Company, Rockford, IL (US)

( * ) Notice: Subject to any disclaimer, the term of this patent is extended or adjusted under 35 U.S.C. 154(b) by 72 days.

(21) Appl. No.: 15/586,661

(22) Filed: May 4, 2017

(51) Int. Cl.
*B23C 5/20* (2006.01)
*B23C 5/22* (2006.01)

(52) U.S. Cl.
CPC .... *B23C 5/2208* (2013.01); *B23C 2200/0433* (2013.01)

(58) Field of Classification Search
CPC ............... B23C 5/207; B23C 2200/16; B23C 2200/367; B23C 5/2208
See application file for complete search history.

(56) References Cited

U.S. PATENT DOCUMENTS

| | | |
|---|---|---|
| 4,285,618 A | 8/1981 | Shanley, Jr. |
| 4,790,693 A | 12/1988 | Koblesky |
| 5,944,456 A | 8/1999 | Shirley et al. |
| 6,659,694 B1 | 12/2003 | Asbell et al. |
| 6,773,209 B2 | 8/2004 | Craig |
| 6,921,233 B2 | 7/2005 | Duerr et al. |
| 6,976,811 B1 | 12/2005 | DeRoche et al. |
| 7,073,987 B2 | 7/2006 | Hecht |

(Continued)

FOREIGN PATENT DOCUMENTS

| | | | |
|---|---|---|---|
| JP | 577983062 | 9/2015 | |
| JP | WO 2016084891 A1 * | 6/2016 | ............. B23C 5/109 |
| WO | WO 2016/147493 A1 | 9/2016 | |

OTHER PUBLICATIONS

International Search Report dated Sep. 3, 2018, issued in PCT counterpart application (No. PCT/IB2018/052801).

(Continued)

*Primary Examiner* — Alan Snyder
(74) *Attorney, Agent, or Firm* — Womble Bond Dickinson (US) LLP (57) ABSTRACT

A cutting insert has opposing front and back end surfaces with a peripheral side surface extending therebetween and a first axis extending therethrough, and a median plane perpendicular to the first axis located between the front and back end surfaces. Each of the front and back end surfaces has a rectangular shape in a respective end view thereof, and two diagonally opposed raised corners and two diagonally opposed lowered corners with respect to the median plane. The front end surface has a front major cutting edge associated therewith, and in a cross-section taken in a first plane containing the first axis, the front end surface has a concave shape and the back end surface has a convex shape. The cutting insert is removably secured in an insert receiving pocket of a cutting tool with the peripheral side surface and back end surface making contact with pocket support walls.

32 Claims, 6 Drawing Sheets

(56) References Cited

U.S. PATENT DOCUMENTS

| | | |
|---|---|---|
| 7,094,007 B2 | 8/2006 | Satran et al. |
| 7,104,736 B2 | 9/2006 | Satran et al. |
| 7,241,082 B2 | 7/2007 | Smilovici et al. |
| 7,246,973 B2 | 7/2007 | Johnson et al. |
| 7,367,753 B2 | 5/2008 | Maurer |
| 7,560,068 B2 | 7/2009 | Smilovici et al. |
| 8,449,230 B2 | 5/2013 | Nguyen et al. |
| 8,696,257 B2 | 4/2014 | Saito et al. |
| 8,753,045 B2 | 6/2014 | Hecht |
| 8,876,440 B2 | 11/2014 | Nam et al. |
| 9,186,732 B2 | 11/2015 | Michelete et al. |
| 2003/0223828 A1 | 12/2003 | Craig |
| 2003/0223829 A1 | 12/2003 | Craig |
| 2005/0063792 A1 | 3/2005 | Satran |
| 2010/0047026 A1 | 2/2010 | Horiike et al. |
| 2011/0129309 A1 | 6/2011 | Kovac et al. |
| 2011/0280673 A1 | 11/2011 | Degany |
| 2017/0014918 A1 | 1/2017 | Aso |
| 2017/0036279 A1 | 2/2017 | Yamamoto |

OTHER PUBLICATIONS

Written Opinion dated Sep. 3, 2018, issued in PCT counterpart application (No. PCT/IB2018/052801).

\* cited by examiner

CUTTING INSERT HAVING NON-IDENTICAL RECTANGULAR END SURFACES WITH RAISED AND LOWERED CORNER PORTIONS AND CUTTING TOOL

FIELD OF THE INVENTION

The present invention relates to a cutting tool and a cutting insert with rectangular shaped end surfaces having raised and lowered corners therefor, for use in metal cutting processes in general, and for milling operations in particular.

BACKGROUND OF THE INVENTION

Within the field of cutting tools used in milling operations, there are many examples of cutting inserts with rectangular shaped end surfaces having raised and lowered corners removably retained in an insert receiving pocket of a cutting body.

U.S. Pat. No. 8,696,257 discloses a 'single-sided' cutting insert with rectangular shaped opposing end surfaces having an insert center line extending therethrough, with one end surface having diagonally opposed raised corners and diagonally opposed lowered corners, and both end surfaces having a concave shape in a cross-section taken in a plane containing the insert center line, as shown in FIG. 7 thereof.

U.S. Pat. No. 8,876,440 discloses a 'double-sided' cutting insert with rectangular shaped opposing end surfaces, with both end surfaces having diagonally opposed raised corners and diagonally opposed lowered corners, and both end surfaces having a concave shape in a cross-section taken in a plane containing an imaginary axis extending through the end surfaces, as shown in FIG. 4 thereof.

U.S. Pat. No. 9,186,732 discloses a 'double-sided' cutting insert with rectangular shaped opposing end surfaces, with both end surfaces having diagonally opposed raised corners and diagonally opposed lowered corners, and both end surfaces having a concave shape in a cross-section taken in a plane containing an imaginary axis extending through the end surfaces, as shown in FIG. 1G thereof. Also in a side view of the cutting insert, as shown in FIG. 1B thereof, the two visible lowered corners are located on the same side of the said plane.

SUMMARY OF THE INVENTION

In accordance with the present invention, there is provided a cutting insert comprising:

non-identical, opposing front and back end surfaces, each of the front and back end surfaces having a rectangular shape in a respective end view thereof, a peripheral side surface extending between the front and back end surfaces, the peripheral side surface including two opposing major side surfaces and two opposing minor side surfaces, a first axis intersecting the front and back end surfaces, a first plane located between the two opposing minor side surfaces, the first plane containing the first axis, a second axis perpendicular to the first plane and intersecting the two minor side surfaces, a second plane located between the two opposing major side surfaces, the second plane containing both the first axis and the second axis and being perpendicular to the first plane, a median plane located between the front and back end surfaces, the median plane being perpendicular to the first axis, and at least one front major cutting edge formed at the intersection of the front end surface and the two major side surfaces, wherein:
the front end surface has two diagonally opposed front raised corners and two diagonally opposed front lowered corners with respect to the median plane,
the back end surface has two diagonally opposed back raised corners and two diagonally opposed back lowered corners with respect to the median plane, and
in a cross-section taken in the first plane, the front end surface has a concave shape and the back end surface has a convex shape.

Also in accordance with the present invention, there is provided a cutting tool comprising a cutting body having a first insert receiving pocket provided with a seat surface and first and second support walls transverse to the seat surface; and a cutting insert as described above removably secured in the first insert receiving pocket, wherein:
one of the insert's major side surfaces is in contact with the seat surface,
one of the insert's minor side surfaces is in contact with the first support wall, and
the insert's back end surface is in contact with the second support wall.

BRIEF DESCRIPTION OF THE DRAWINGS

For a better understanding, the invention will now be described, by way of example only, with reference to the accompanying drawings in which chain-dash lines represent cut-off boundaries for partial views of a member and in which.

DETAILED DESCRIPTION OF THE INVENTION

The present invention relates to a cutting insert 20. In some embodiments of the present invention, the cutting insert 20 may preferably be manufactured by form pressing and sintering a cemented carbide, such as tungsten carbide, and may be coated or uncoated.

As seen in FIGS. 1 to 8, the cutting insert 20 has non-identical, opposing front and back end surfaces 22, 24 with a peripheral side surface 26 extending therebetween.

The various features of the cutting insert 20 are shown in proportion to one another in FIGS. 1 to 8, except for unavoidable inaccuracies due to copying, etc.

Figure 5:
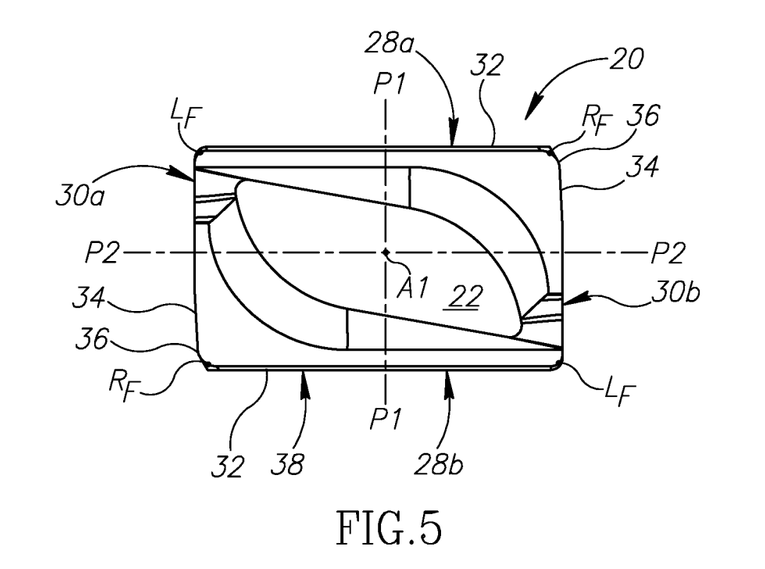
FIG. 5 is a front end view of the cutting insert shown in FIG. 1.
Figure 6:
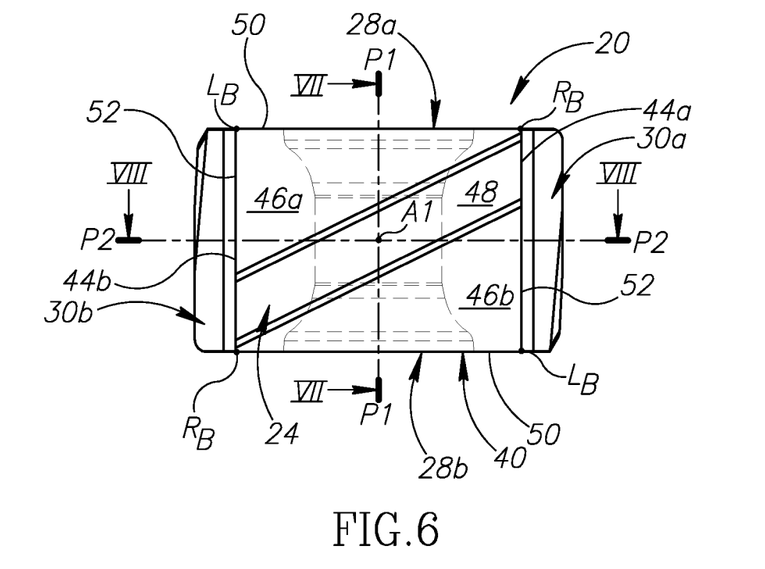
FIG. 6 is a rear end view of the cutting insert shown in FIG. 1.

The peripheral side surface 26 includes two opposing major side surfaces 28a, 28b and two opposing minor side surfaces 30a, 30b, and as shown in FIGS. 5 and 6, each of the front and back end surfaces 22, 24 has a rectangular shape in a respective end view thereof.

Figure 3:
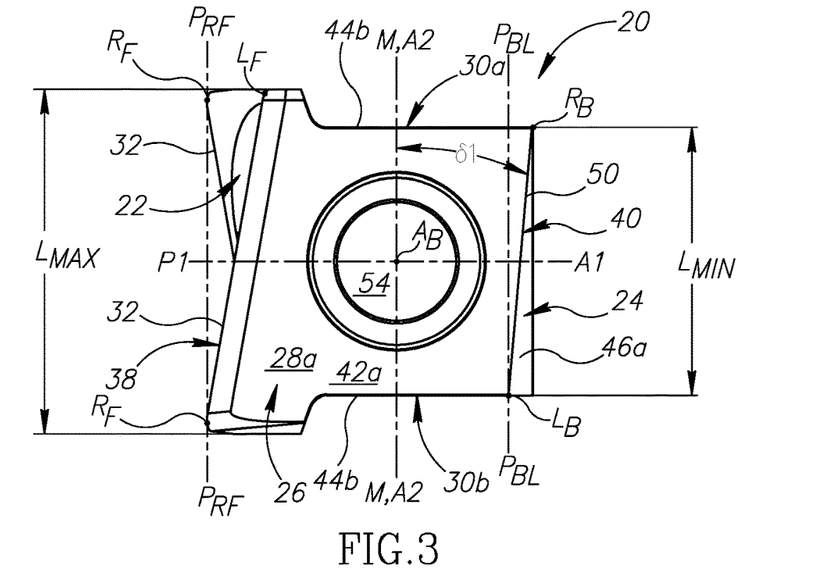
FIG. 3 is a major side view of the cutting insert shown in FIG. 1.

A first axis A1 intersects the front and back end surfaces 22, 24. As seen in FIG. 3, a first plane P1 located between the opposing minor side surfaces 30a, 30b contains the first axis A1 and also intersects the front and back end surfaces 22, 24.

As seen in FIGS. 5 and 6, in views along the first axis A1, the front end surface 22 may have a larger surface area than the back end surface 24.

A second axis A2, perpendicular to the first plane P1, intersects the two minor side surfaces 30a, 30b. A second plane P2 located between the two opposing major side surfaces 28a, 28b is perpendicular to first plane P1 and contains the first and second axes A1, A2.

As seen in FIG. 3, a median plane M, perpendicular to the first axis A1 is located between the front and back end surfaces 22, 24.

The median plane M intersects the peripheral side surface 26 and is perpendicular to the first and second planes P1, P2.

In some embodiments of the present invention, the first axis A1 may intersect the front and back end surfaces 22, 24 at front and back end points N1, N2, respectively, and the median plane M may be located midway between the front and back end points N1, N2.

As shown in FIGS. 1, 2, 3 and 7, a through bore 54 may extend between and open out to the two major side surfaces 28a, 28b.

In some embodiments of the present invention, the through bore 54 may extend along a bore axis $A_B$. The bore axis $A_B$ may be contained in the first plane P1.

Also in some embodiments of the present invention, the median plane M may contain the bore axis $A_B$.

Figure 1:
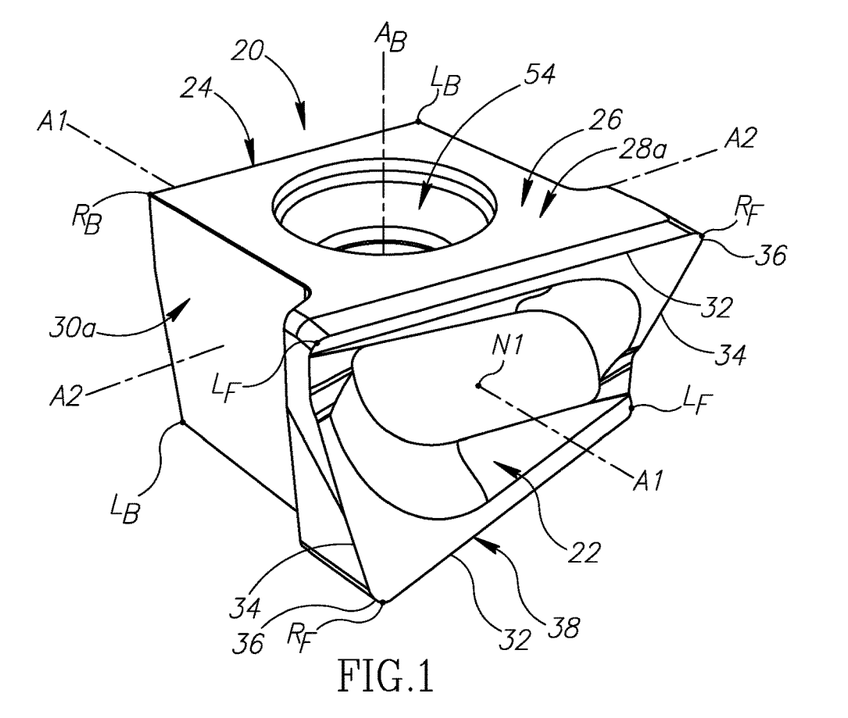
FIG. 1 is a front perspective view of a cutting insert in accordance with some embodiments of the present invention.

As shown in FIGS. 1, 3 and 5, at least one front major cutting edge 32 is formed at the intersection of the front end surface 22 and the two major side surfaces 28a, 28b.

In some embodiments of the present invention, as shown in FIG. 3, the at least one front major cutting edge 32 may be straight in a side view of its associated major side surface 28a, 28b.

As shown in FIG. 5, the front end surface 22 may exhibit rotational symmetry about the first axis A1.

In some embodiments of the present invention, two spaced apart front major cutting edges 32 may be formed at the intersection of the front end surface 22 and the two major side surfaces 28a, 28b.

Also in some embodiments of the present invention, the cutting insert 20 may exhibit rotational symmetry about the first axis A1.

Further in some embodiments of the present invention, the cutting insert 20 may lack rotational symmetry about both the second axis A2 and the bore axis $A_B$.

Yet further in some embodiments of the present invention, the cutting insert 20 may lack mirror symmetry about all three of the first plane P1, the second plane P2 and the median plane M.

It should be appreciated that in some embodiments of the present invention, the cutting insert 20 may be indexable about the first axis A1.

In some embodiments of the present invention, two spaced apart front minor cutting edges 34 may be formed at the intersection of the front end surface 22 and the two minor side surfaces 30a, 30b, and the two front minor cutting edges 34 may alternate with the two front major cutting edges 32.

Figure 4:
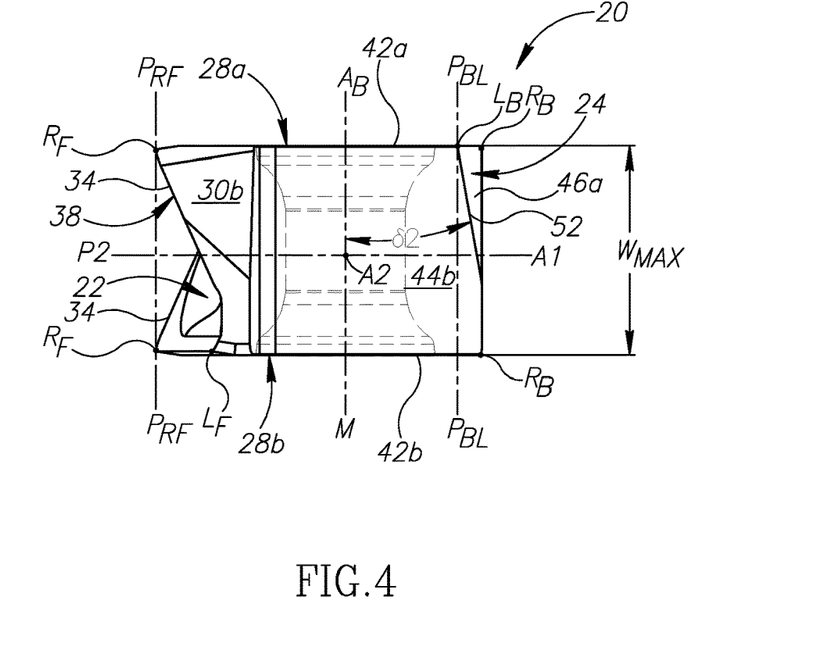
FIG. 4 is a minor side view of the cutting insert shown in FIG. 1.

Also in some embodiments of the present invention, as shown in FIG. 4, each front minor cutting edge 34 may be straight in a side view of its associated minor side surface 30a, 30b.

Further in some embodiments of the present invention, a curved corner cutting edge 36 may extend between each front major cutting edge 32 and one of the front minor cutting edges 34.

According to the present invention, as shown in FIGS. 1, 3, 4 and 5, the front end surface 22 has two diagonally opposed front raised corners $R_F$ and two diagonally opposed front lowered corners $L_F$ with respect to the median plane M.

It should be appreciated that the two front raised corners $R_F$ are located further from the median plane M than the two front lowered corners $L_F$.

It should be appreciated that for embodiments of the present invention having two front major cutting edges 32, two front minor cutting edges 34 and two curved corner cutting edges 36, each front raised corner $R_F$ may be disposed on one of the curved corner cutting edges 36.

As shown in FIGS. 1, 3, 4 and 5, a continuous front peripheral edge 38 may be formed at the intersection of the front end surface 22 and the peripheral side surface 26, and a front raised plane $P_{RF}$ parallel to the median plane M may intersect the two front raised corners $R_F$.

In some embodiments of the present invention, no point along the front peripheral edge 38 may be located further from the median plane M than the front raised plane $P_{RF}$.

Also in some embodiments of the present invention, no point on the front end surface 22 may be located further from the median plane M than the front raised plane $P_{RF}$.

According to the present invention, as shown in FIGS. 2, 3, 4 and 6, the back end surface 24 has two diagonally opposed back raised corners $R_B$ and two diagonally opposed back lowered corners $L_B$ with respect to the median plane M.

It should be appreciated that the two back lowered corners $L_B$ are located closer to the median plane M than the two back raised corners $R_B$.

As shown in FIGS. 2, 3, 4 and 6, a continuous back peripheral edge 40 may be formed at the intersection of the back end surface 24 and the peripheral side surface 26, and a back lowered plane $P_{BL}$ parallel to the median plane M may intersect the two back lowered corners $L_B$.

In some embodiments of the present invention, no point along the back peripheral edge 40 may be located closer to the median plane M than the back lowered plane $P_{BL}$.

Also in some embodiments of the present invention, no point on the back end surface 24 may be located closer to the median plane M than the back lowered plane $P_{BL}$.

As shown in FIG. 3, the cutting insert 20 has a length dimension measured along the second axis A2. A minimum length $L_{MIN}$ is defined as the shortest distance between the two minor side surfaces 30a, 30b, while a maximum length $L_{MAX}$ is defined as the longest distance between the two minor side surfaces 30a, 30b.

In some embodiments of the present invention, the maximum length $L_{MAX}$ may be greater than the minimum length $L_{MIN}$.

Also in some embodiments of the present invention, a ratio R1 of the maximum length $L_{MAX}$ to the minimum length $L_{MIN}$ may be greater than or equal to 1.1. (R1=$L_{MAX}$/$L_{MIN}$≥1.1).

As shown in FIG. 4, the cutting insert 20 has a width dimension measured in a direction perpendicular to the second plane P2 (e.g., along the bore axis $A_B$). The insert 20 has a maximum width $W_{MAX}$ defined as the greatest distance between the two major side surfaces 28a, 28b.

In some embodiments of the present invention, the minimum length $L_{MIN}$ may be greater than the maximum width $W_{MAX}$.

Also in some embodiments of the present invention, as shown in FIG. 3, the minimum length $L_{MIN}$ may be measured on either side of the median plane M.

Further in some embodiments of the present invention, the back end surface 24 may be devoid of a cutting edge, and the cutting insert 20 may be termed as 'single-sided'.

Figure 7:
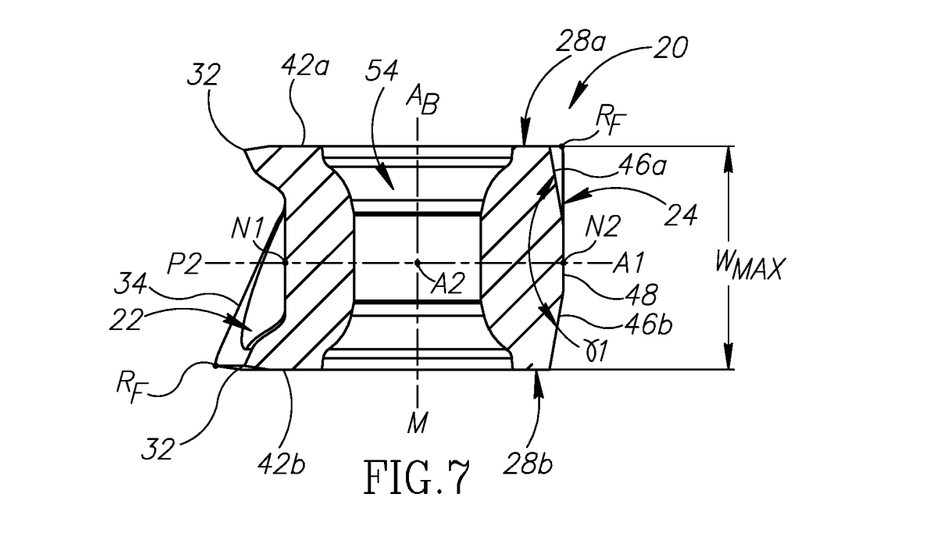
FIG. 7 is a cross-sectional view of the cutting insert shown in FIG. 6, taken along the line VII-VII.

According to the present invention, as shown in FIG. 7, in a cross-section taken in the first plane P1, the back end surface 24 has a convex shape.

It should be appreciated that the term "convex", used herein, refers to at least part of the cross-sectional profile of the back end surface 24 having two side portions spaced apart by a mid-portion, where the mid-portion is raised or bulges in a direction away from the median plane M, with respect to the two adjacent side portions.

In some embodiments of the present invention, as also seen in FIG. 7, in the cross-section taken in the first plane P1, the second plane P2 may intersect the convex profile of the back end surface 24 at its raised mid-portion.

Also in some embodiments of the present invention, in the cross-section taken in the first plane P1, as shown in FIG. 7, the convex profile of the back end surface 24 may span the entire extent of the cutting insert 20 between the two opposing major side surfaces 28a, 28b.

Further in some embodiments of the present invention, no point on the back end surface 24 may be located further from the median plane M than the back end point N2.

Yet further in some embodiments of the present invention, in a cross-section taken in any plane parallel to the first plane P1 and intersecting the front and back end surfaces 22, 24, the back end surface 24 may have a convex shape.

As shown in FIG. 3, the first plane P1 may intersect the two major side surfaces 28a, 28b and the at least one front major cutting edge 32.

In some embodiments of the present invention, as shown in FIG. 3, the first plane P1 may be located midway between the two minor side surfaces 30a, 30b, and preferably bisect the minimum length $L_{MIN}$ dimension.

As shown in FIG. 7, in the cross-section taken in the first plane P1, the front end surface 22 has a concave shape.

It should be appreciated that the term "concave", used herein, refers to at least part of the cross-sectional profile of the front end surface 22 having two side portions spaced apart by a mid-portion, where the mid-portion is recessed or sunken in a direction towards the median plane M, with respect to the two adjacent side portions.

In some embodiments of the present invention, in the cross-section taken in the first plane P1, the second plane P2 may intersect the concave profile of the front end surface 22 at its recessed mid-portion.

Also in some embodiments of the present invention, in the cross-section taken in the first plane P1, the concave profile of the front end surface 22 may span the entire extent of the cutting insert 20 between the two opposing major side surfaces 28a, 28b.

Further in some embodiments of the present invention, no point on the front end surface 22 may be located closer to the median plane M than the first end point N1.

As shown in FIG. 3, the minimum length $L_{MIN}$ may be measured perpendicular to the first plane P1.

In some embodiments of the present invention, each of the at least one front major cutting edge 32 may extend further than half the minimum length $L_{MIN}$ from the first plane P1 in at least one direction therefrom.

Also in some embodiments of the present invention, each of the at least one front major cutting edge 32 may extend further than half the minimum length $L_{MIN}$ from the first plane P1 in two opposing directions therefrom.

As shown in FIG. 4, the second plane P2 may intersect the two minor side surfaces 30a, 30b and the two front minor cutting edges 34.

In some embodiments of the present invention, as shown in FIG. 4, the second plane P2 may be located midway between the two major side surfaces 28a, 28b, and preferably bisect the maximum width $W_{MAX}$ dimension.

As shown in FIGS. 6 and 7, each of the major side surfaces 28a, 28b may include a planar major sub-surface 42a, 42b, and each of the major sub-surfaces 42a, 42b may be perpendicular to the median plane M and the first plane P1.

In some embodiments of the present invention, each of the major sub-surfaces 42a, 42b may be contiguous with the back end surface 24.

Also in some embodiments of the present invention, as shown in FIG. 7, the maximum width $W_{MAX}$ may be measured between the two major sub-surfaces 42a, 42b.

As shown in FIGS. 3 and 6, each of the minor side surfaces 30a, 30b may include a planar minor sub-surface 44a, 44b, and the first plane P1 may be located midway between and parallel to the two minor sub-surfaces 44a, 44b.

In some embodiments of the present invention, the median plane M may intersect each of the minor sub-surfaces 44a, 44b.

Also in some embodiments of the present invention, each of the minor sub-surfaces 44a, 44b may be contiguous with the back end surface 24.

As shown in FIG. 3, the minimum length $L_{MIN}$ may be measured between the two minor sub-surfaces 44a, 44b, on either side of the median plane M.

In some embodiments of the present invention, each of the front lowered corners $L_F$ may be located further from the first plane P1 than each of the minor sub-surfaces 44a, 44b.

Also in some embodiments of the present invention, each of the front lowered corners $L_F$ may be located further from the first plane P1 than each of the back raised and lowered corners $R_B$, $L_B$.

Further in some embodiments of the present invention, each of the front raised and lowered corners $R_F$, $L_F$ may be located further from the first plane P1 than each of the minor sub-surfaces 44a, 44b.

Yet further in some embodiments of the present invention, each of the front raised and lowered corners $R_F$, $L_F$ may be located further from the first plane P1 than each of the back raised and lowered corners $R_B$, $L_B$.

As shown in FIG. 3, in a side view of each major side surface 28a, 28b, the associated front lowered corner $L_F$ and back lowered corner $L_B$ may be located on opposite sides of the first plane P1.

Figure 2:
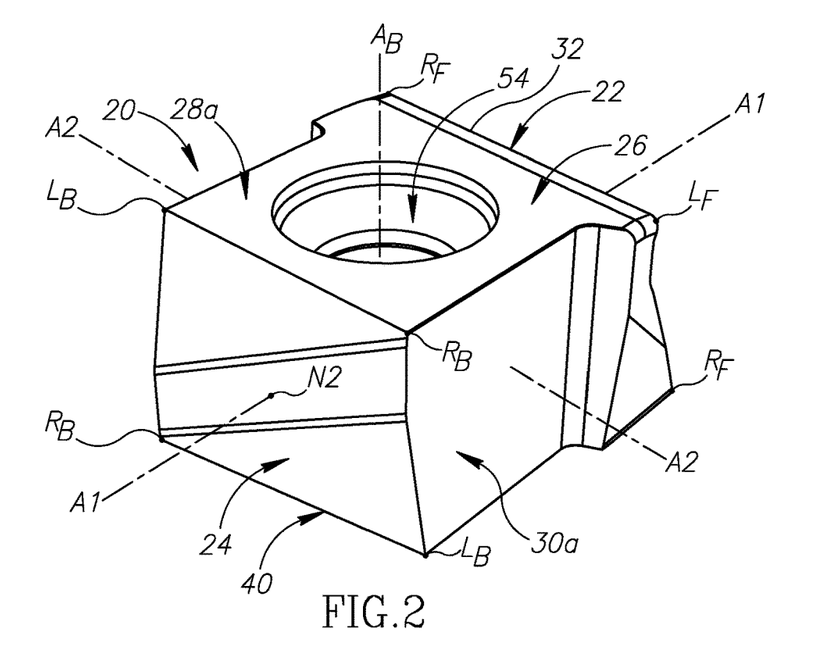
FIG. 2 is a rear perspective view of the cutting insert shown in FIG. 1.

As shown in FIGS. 2 and 6, the back end surface 24 may have two back abutment surfaces 46a, 46b.

In some embodiments of the present invention, each back abutment surface 46a, 46b may be planar.

Also in some embodiments of the present invention, the two back abutment surfaces 46a, 46b may be spaced apart by an intermediate surface 48.

As shown in FIG. 7, in the cross-section taken in the first plane P1, the two back abutment surfaces 46a, 46b may form an internal obtuse first insert angle γ1.

In some embodiments of the present invention, the first insert angle γ1 may have a range from 130 to 170 degrees.

Also in some embodiments of the present invention, in a cross-section taken in any plane parallel to the first plane P1 and intersecting the front and back end surfaces 22, 24, the two back abutment surfaces 46a, 46b may form an internal obtuse angle equal to the first insert angle γ1.

It should also be appreciated that use of the terms "internal angle" and "external angle" throughout the description and claims refers to an angle between two surface components of a pair of surfaces as measured internal and external to the member on which the two surface components are formed, respectively.

Figure 8:
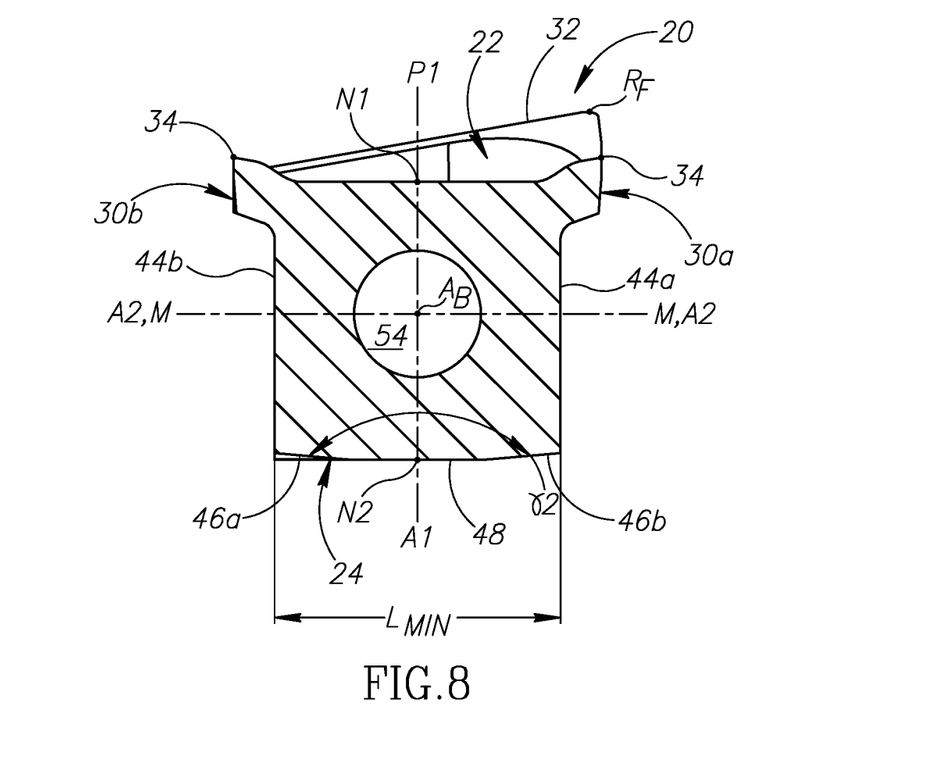
FIG. 8 is a cross-sectional view of the cutting insert shown in FIG. 6, taken along the line VIII-VIII.

As shown in FIG. 8, in a cross-section taken in the second plane P2, the back end surface 24 may have a convex shape.

In some embodiments of the present invention, in the cross-section taken in the second plane P2, the first plane P1 may intersect the convex profile of the back end surface 24 at its raised mid-portion.

Also in some embodiments of the present invention, in the cross-section taken in the second plane P2, the convex profile of the back end surface 24 may span the entire extent of the cutting insert 20 between the two opposing minor side surfaces 30a, 30b.

As shown in FIG. 8, in the cross-section taken in the second plane P2, the two back abutment surfaces 46a, 46b may form an internal obtuse second insert angle γ2.

In some embodiments of the present invention, the second insert angle γ2 may be greater than the first insert angle γ1.

Also in some embodiments of the present invention, the second insert angle γ2 may have a range from 150 to 175 degrees.

As shown in FIGS. 2, 3, 6 and 7, each back abutment surface 46a, 46b may be contiguous with one of the major side surfaces 28a, 28b, and a major back edge 50 may be formed between each back abutment surface 46a, 46b and its associated major side surface 28a, 28b.

It should be appreciated that the major back edge 50 gets closer to the median plane M as it extends towards the back lowered corner $L_B$.

In some embodiments of the present invention, each major back edge 50 may be straight and form an acute first slant angle δ1 of less than 15 degrees with the median plane M.

As shown in FIGS. 2, 4, 6 and 8, each back abutment surface 46a, 46b may be contiguous with at least one of the minor side surfaces 30a, 30b, and a minor back edge 52 may be formed between each back abutment surface 46a, 46b and one of the associated minor side surfaces 30a, 30b.

It should be appreciated that the minor back edge 52 gets closer to the median plane M as it extends towards the back lowered corner $L_B$.

In some embodiments of the present invention, each minor back edge 52 may be straight and form an acute second slant angle δ2 of less than 25 degrees with the median plane M.

Also in some embodiments of the present invention, each back abutment surface 46a, 46b may be contiguous with both of the minor side surfaces 30a, 30b.

As shown in FIGS. 9 to 12, the present invention also relates to a cutting tool 56 comprising a cutting body 58 having a first insert receiving pocket 60 with the cutting insert 20 removably secured therein, the first insert receiving pocket 60 having a seat surface 62 with first and second support walls 64, 66 transverse thereto.

In an assembled state of the cutting tool 56:
one of the insert's major side surfaces 28a, 28b may be in contact with the seat surface 62,
one of the insert's minor side surfaces 30a, 30b may be in contact with the first support wall 64, and
the insert's back end surface 24 may be in contact with the second support wall 66.

In some embodiments of the present invention, a clamping screw 68 may extend through the through bore 54 and threadingly engage a screw bore 70 in the seat surface 62.

Also in some embodiments of the present invention, the clamping screw 68 may have a head portion 72 in clamping contact with the through bore 54 and a threaded shank portion 74 extending therefrom.

Figure 11:
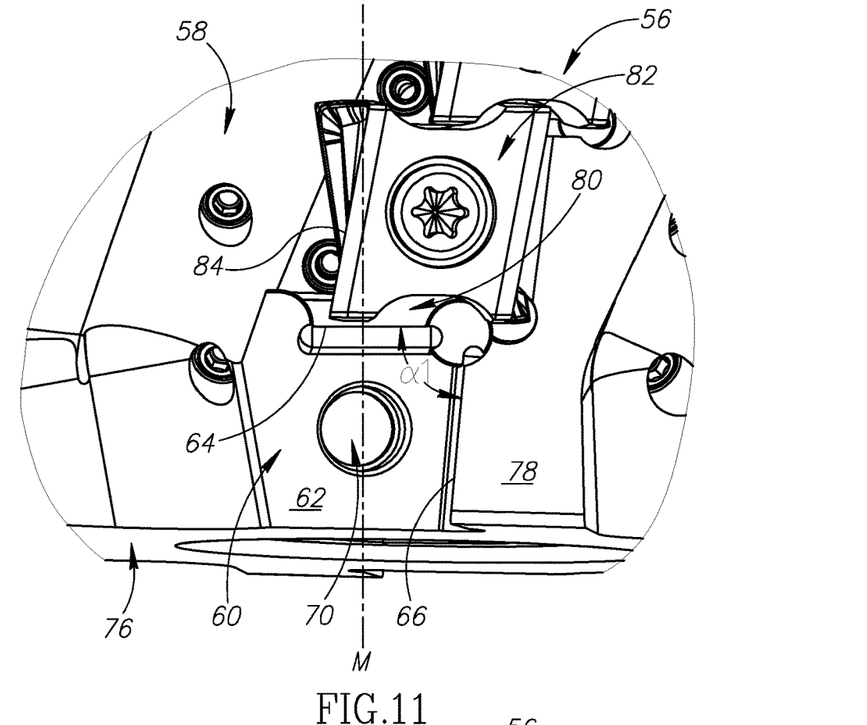
FIG. 11 is a detailed side view of the cutting tool shown FIG. 9, taken perpendicular a seat surface of a first insert receiving pocket, with the cutting insert and its clamping screw removed.

As shown in FIG. 11, in a side view of the cutting body 58, the first and second support walls 64, 66 may form an external acute first pocket angle α1.

It should be appreciated that with respect to the first insert receiving pocket 60, FIG. 11 represents a side view of the cutting body 58, in view of the cutting insert 20 and the clamping screw 68 being removed.

It should also be appreciated that the first pocket angle α1 may be approximately 90 degrees minus the first slant angle δ1. This helps ensure adequate contact between one of the two back abutment surfaces 46a, 46b of the convex shaped back end surface 24, and the second support wall 66, in each index position of the cutting insert 20.

Figure 12:
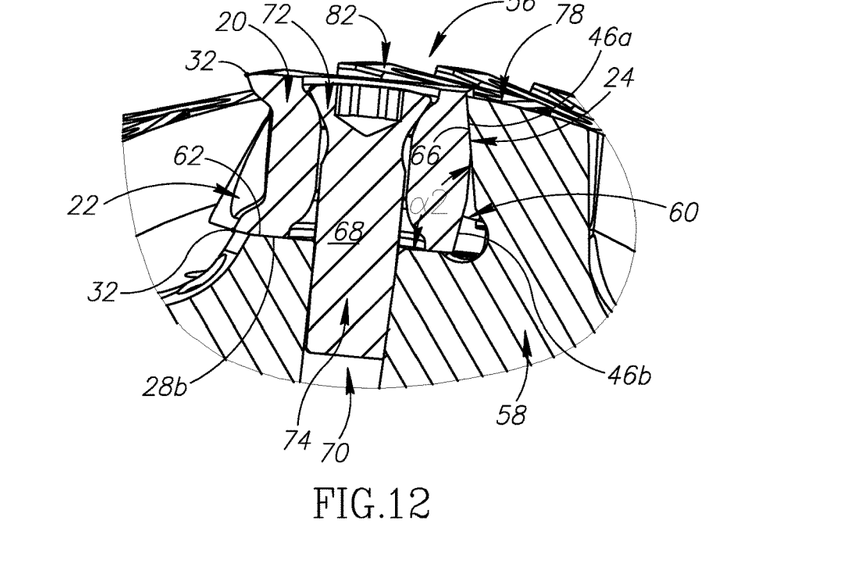
FIG. 12 is a cross-sectional view of the cutting tool shown in FIG. 10, taken along the line XII-XII.

As shown in FIG. 12, in a cross-section taken in a tool plane PT intersecting the seat surface 62 and the second support wall 66, the seat surface 62 and the second support wall 66 may form an external acute second pocket angle α2.

In some embodiments of the present invention, the tool plane PT may intersect the at least one front major cutting edge 32.

It should be appreciated that the second pocket angle α2 may be approximately 90 degrees minus the second slant angle δ2, and approximately half of the first insert angle γ1. This helps ensure adequate contact between one of the two back abutment surfaces 46a, 46b of the convex shaped back end surface 24, and the second support wall 66, in each index position of the cutting insert 20.

Figure 9:
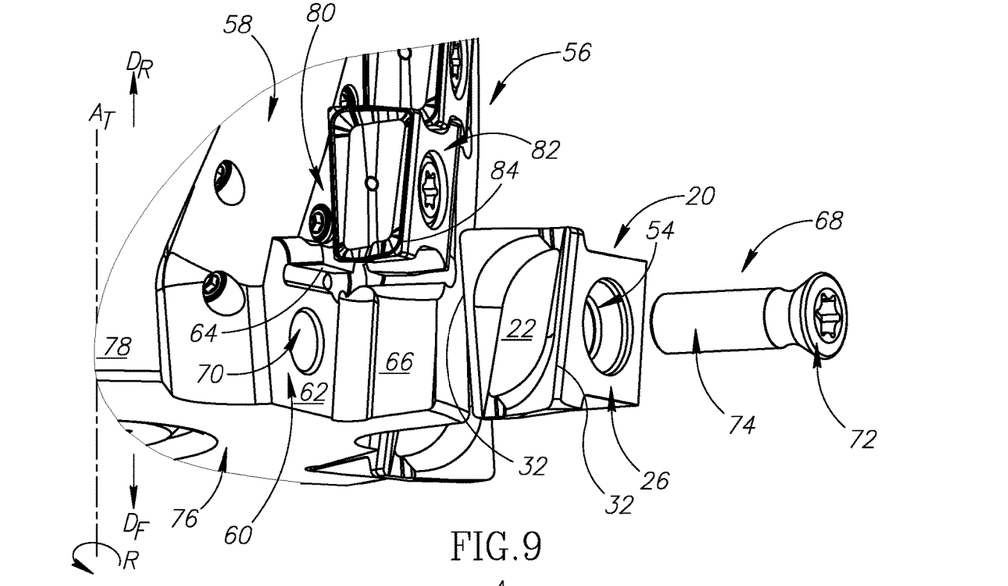
FIG. 9 is a detailed partially exploded view of a cutting tool in accordance with some embodiments of the present invention.
Figure 10:
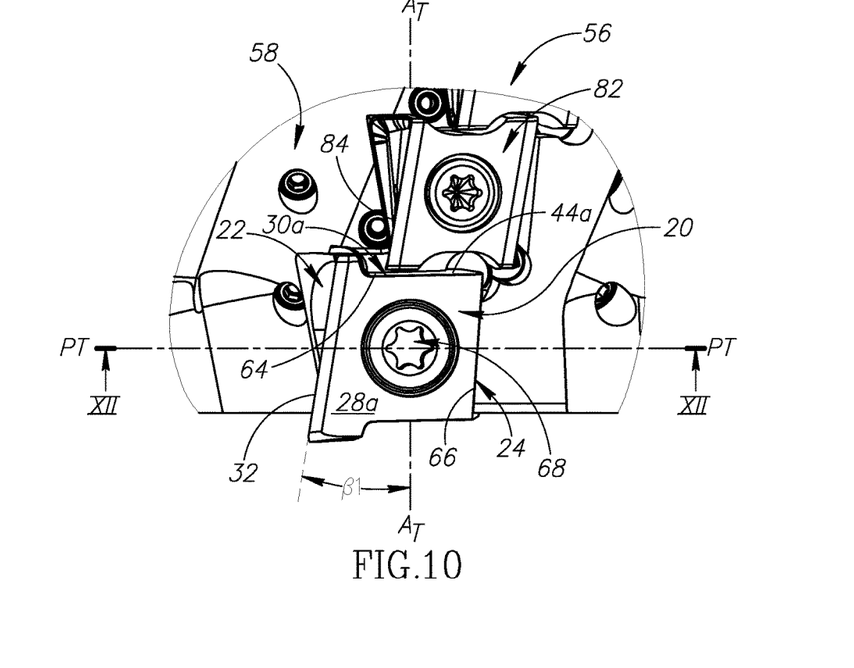
FIG. 10 is a detailed side view of the cutting tool shown FIG. 9.

As shown in FIGS. 9 and 10, the cutting tool 56 may be rotatable about a tool axis AT defining a forward-rearward direction $D_F$, $D_R$, and the first insert receiving pocket 60 may open out at a forward end surface 76 of the cutting body 58.

In some embodiments of the present invention, the tool plane PT may be perpendicular to the tool axis AT.

As shown in FIGS. 9 and 10, the cutting tool 56 may have a direction of rotation R about the tool axis AT, and the second support wall 66 may face the direction of rotation R.

In some embodiments of the present invention, the seat surface 62 may provide radial support for the cutting insert 20, the first support wall 64 may provide axial support for the cutting insert 20, and the second support wall 66 may provide tangential support for the cutting insert 20.

It should be appreciated that configuring the first and second support walls 64, 66 to form an external acute first pocket angle α1 results in axial cutting forces acting on the first support wall 64 being partially directed towards the second support wall 66, and tangential cutting forces acting on the second support wall 66 being partially directed towards the first support wall 64, which advantageously results in a stable clamping arrangement and reduced axial and tangential cutting forces acting on the clamping screw 68 during machining operations.

It should also be appreciated that configuring the seat surface 62 and the second support wall 66 to form an external acute second pocket angle α2 results in tangential cutting forces acting on the second support wall 66 being partially directed towards the seat surface 62, which advantageously results in a stable clamping arrangement and reduced tangential cutting forces acting on the clamping screw 68 during machining operations.

As shown in FIG. 10, one of the minor sub-surfaces 44a, 44b may be in contact with the first support wall 64.

In some embodiments of the present invention, one of the minor sub-surfaces 44a, 44b may be in contact with the entire first support wall 64.

As shown in FIG. 11, the median plane M may intersect the first support wall 64.

It should be appreciated in FIG. 11, that although the cutting insert 20 and the clamping screw 68 have been removed, the median plane M is shown.

It should also be appreciated that for embodiments of the present invention in which one of the minor sub-surfaces 44a, 44b is in contact with the entire first support wall 64, and the median plane M is located midway between the front and back end points N1, N2, configuring the median plane M to intersect the first support wall 64 provides central and stable support for the cutting insert 20.

As shown in FIG. 9, the cutting body 58 may have a cylindrical outer peripheral surface 78 extending axially rearwardly from the forward end surface 76, and the second support wall 66 may intersect the outer peripheral surface 78.

In some embodiments of the present invention, only one of the two back abutment surfaces 46a, 46b may be in contact with the second support wall 66, with contact occurring at the radially outermost portion of the second support wall 66.

It should be appreciated that apart from only one of the two back abutment surfaces 46a, 46b being in contact with the second support wall 66, no other portion of the back end surface 24 is in contact with the first insert receiving pocket 60.

It should also be appreciated that configuring the radially outermost portion of the second support wall 66 to be in contact with the back end surface 24 results in tangential support for the cutting insert 20 being provided radially outward of the region of clamping contact between the head portion 72 and the through bore 54, which advantageously results in a stable clamping arrangement and reduced tangential cutting forces acting on the clamping screw 68 during machining operations.

As shown in FIG. 10, one of the at least one front major cutting edge 32 is operative, having a positive axial rake angle β1.

Also, as shown in FIG. 10, the cutting tool 56 may include a second insert receiving pocket 80 located axially rearward of the first insert receiving pocket 60, with a second cutting insert 82 removably secured therein having an operative second insert front major cutting edge 84.

As seen in FIGS. 9 to 12, the first cutting insert 20 and the second cutting insert 82 are dissimilar.

It should be appreciated that for embodiments of the present invention in which one of the minor sub-surfaces 44a, 44b is in contact with the first support wall 64, and each front major cutting edge 32 extends further than half the minimum length $L_{MIN}$ from the first plane P1, the operative front major cutting edge 32 and second insert front major cutting edge 84 may axially overlap, to advantageously provide a continuous effective cutting edge.

Although the present invention has been described to a certain degree of particularity, it should be understood that various alterations and modifications could be made without departing from the spirit or scope of the invention as hereinafter claimed.

What is claimed is:
1. A cutting insert (20), comprising:
    non-identical, opposing front and back end surfaces (22, 24), each of the front and back end surfaces (22, 24) having a rectangular shape in a respective end view thereof,
    a peripheral side surface (26) extending between the front and back end surfaces (22, 24), the peripheral side surface (26) including two opposing major side surfaces (28a, 28b) and two opposing minor side surfaces (30a, 30b),
    a first axis (A1) intersecting the front and back end surfaces (22, 24),
    a first plane (P1) located between the two opposing minor side surfaces (30a, 30b), the first plane (P1) containing the first axis (A1),
    a second axis (A2) perpendicular to the first plane (P1) and intersecting the two minor side surfaces (30a, 30b),
    a second plane (P2) located between the two opposing major side surfaces (28a, 28b), the second plane (P2) containing both the first axis (A1) and the second axis (A2) and being perpendicular to the first plane (P1),
    a median plane (M) located between the front and back end surfaces (22, 24), the median plane (M) being perpendicular to the first axis (A1), and
    at least one front major cutting edge (32) formed at the intersection of the front end surface (22) and the two major side surfaces (28a, 28b),
    wherein:
    the front end surface (22) has two diagonally opposed front raised corners ($R_F$) and two diagonally opposed front lowered corners ($L_F$) with respect to the median plane (M),
    the back end surface (24) has two diagonally opposed back raised corners ($R_B$) and two diagonally opposed back lowered corners ($L_B$) with respect to the median plane (M), and
    in a cross-section taken in the first plane (P1), the front end surface (22) has a concave shape and the back end surface (24) has a convex shape.

2. The cutting insert (20) according to claim 1, wherein:
    in a cross-section taken in any plane parallel to the first plane (P1) and intersecting the front and back end surfaces (22, 24), the back end surface (24) has a convex shape.

3. The cutting insert (20) according to claim 1, wherein:
    in the cross-section taken in the first plane (P1), the convex shape of the back end surface (24) spans the entire extent of the cutting insert (20) between the two opposing major side surfaces (28a, 28b).

4. The cutting insert (20) according to claim 1, wherein:
    in the cross-section taken in the first plane (P1), the concave profile of the front end surface (22) spans the entire extent of the cutting insert (20) between the two opposing major side surfaces (28*a*, 28*b*).

5. The cutting insert (20) according to claim 1, wherein: in a side view of each major side surface (28*a*, 28*b*), the associated front lowered corner ($L_F$) and back lowered corner ($L_B$) are located on opposite sides of the first plane (P1).

6. The cutting insert (20) according to claim 1, wherein: the first plane (P1) intersects the two major side surfaces (28*a*, 28*b*) and the at least one front major cutting edge (32).

7. The cutting insert (20) according to claim 1, wherein: the front end surface (22) exhibits rotational symmetry about the first axis (A1), and
two spaced apart front major cutting edges (32) are formed at the intersection of the front end surface (22) and the two major side surfaces (28*a*, 28*b*).

8. The cutting insert (20) according to claim 1, wherein the back end surface (24) is devoid of a cutting edge.

9. The cutting insert (20) according to claim 1, wherein: the first plane (P1) is located midway between the two opposing minor side surfaces (30*a*, 30*b*).

10. The cutting insert (20) according to claim 1, wherein: in the cross-section taken in the first plane (P1), the second plane (P2) intersects the convex profile of the back end surface (24) at its raised mid-portion.

11. The cutting insert (20) according to claim 10, wherein: in the cross-section taken in the first plane (P1), the second plane (P2) intersects the concave profile of the front end surface (22) at its recessed mid-portion.

12. The cutting insert (20) according to claim 1, wherein: the back end surface (24) has two back abutment surfaces (46*a*, 46*b*), and
in the cross-section taken in the first plane (P1), the two back abutment surfaces (46*a*, 46*b*) form an internal obtuse first insert angle ($\gamma 1$).

13. The cutting insert (20) according to claim 12 wherein: in a cross-section taken in the second plane (P2), the back end surface (24) has a convex shape.

14. The cutting insert (20) according to claim 13, wherein: in the cross-section taken in the second plane (P2), the two back abutment surfaces (46*a*, 46*b*) form an internal obtuse second insert angle ($\gamma 2$), and
the second insert angle ($\gamma 2$) is greater than the first insert angle ($\gamma 1$).

15. The cutting insert (20) according to claim 12, wherein: each back abutment surface (46*a*, 46*b*) is contiguous with one of the major side surfaces (28*a*, 28*b*), and
a major back edge (50) is formed between each back abutment surface (46*a*, 46*b*) and its associated major side surface (28*a*, 28*b*).

16. The cutting insert (20) according to claim 12, wherein: each back abutment surface (46*a*, 46*b*) is contiguous with at least one of the minor side surfaces (30*a*, 30*b*), and
a minor back edge (52) is formed between each back abutment surface (46*a*, 46*b*) and one of the associated minor side surfaces (30*a*, 30*b*).

17. The cutting insert (20) according to claim 1, wherein: the cutting insert (20) has a length dimension measured along the second axis (A2), and a minimum length ($L_{MIN}$) defined as the shortest distance between the two minor side surfaces (30*a*, 30*b*), and
the cutting insert (20) has a width dimension measured in a direction perpendicular to the second plane (P2), and a maximum width ($W_{MAX}$) defined as the greatest distance between the two major side surfaces (28*a*, 28*b*), and
the minimum length ($L_{MIN}$) is greater than the maximum width ($W_{MAX}$).

18. The cutting insert (20) according to claim 17, wherein: each of the at least one front major cutting edge (32) extends further than half the minimum length ($L_{MIN}$) from the first plane (P1) in at least one direction therefrom.

19. The cutting insert (20) according to claim 17, wherein: the first axis (A1) intersects the front and back end surfaces (22, 24) at front and back end points (N1, N2), respectively,
the median plane (M) is located midway between the front and back end points (N1, N2), and
the minimum length ($L_{MIN}$) is measured on either side of the median plane (M).

20. The cutting insert (20) according to claim 17, wherein: the cutting insert (20) has a maximum length ($L_{MAX}$) defined as the greatest distance between the two minor side surfaces (30*a*, 30*b*), and
a ratio (R1) of the maximum length ($L_{MAX}$) to the minimum length ($L_{MIN}$) is greater than or equal to 1.1.

21. The cutting insert (20) according to claim 1, further comprising:
a through bore (54) extending between and opening out to the two major side surfaces (28*a*, 28*b*), the through bore (54) having a bore axis ($A_B$).

22. The cutting insert (20) according to claim 21, wherein: the bore axis ($A_B$) is contained in the first plane (P1);
the cutting insert exhibits rotational symmetry about the first axis (A1) and lacks rotational symmetry about both the second axis (A2) and the bore axis ($A_B$); and
the cutting insert lacks mirror symmetry about all three of the first plane (P1), the second plane (P2) and the median plane (M).

23. The cutting insert (20) according to claim 1, wherein: a continuous front peripheral edge (38) is formed at the intersection of the front end surface (22) and the peripheral side surface (26),
a front raised plane ($P_{RF}$) parallel to the median plane (M) intersects the two front raised corners ($R_F$), and
no point along the front peripheral edge (38) is located further from the median plane (M) than the front raised plane ($P_{RF}$).

24. The cutting insert (20) according to claim 23, wherein: no point on the front end surface (22) is located further from the median plane (M) than the front raised plane ($P_{RF}$).

25. The cutting insert (20) according to claim 1, wherein: a continuous back peripheral edge (40) is formed at the intersection of the back end surface (24) and the peripheral side surface (26),
a back lowered plane ($P_{BL}$) parallel to the median plane (M) intersects the two back lowered corners ($L_B$), and
no point along the back peripheral edge (40) is located closer to the median plane (M) than the back lowered plane ($P_{BL}$).

26. The cutting insert (20) according to claim 25, wherein: no point on the back end surface (24) is located closer to the median plane (M) than the back lowered plane ($P_{BL}$).

27. A cutting tool (56) comprising:
a cutting body (58) having a first insert receiving pocket (60) provided with a seat surface (62) and first and second support walls (64, 66) transverse to the seat surface (62); and
a cutting insert (20) in accordance with claim 1 removably secured in the first insert receiving pocket (60);

wherein:
one of the insert's major side surfaces (28*a*, 28*b*) is in contact with the seat surface (62),
one of the insert's minor side surfaces (30*a*, 30*b*) is in contact with the first support wall (64), and
the insert's back end surface (24) is in contact with the second support wall (66).

28. The cutting tool (56) according to claim 27, wherein:
in a side view of the cutting body (58), the first and second support walls (64, 66) form an external acute first pocket angle ($\alpha 1$).

29. The cutting tool (56) according to claim 27, wherein in a cross-section taken in a tool plane (PT) intersecting the seat surface (62) and the second support wall (66), the seat surface (62) and the second support wall (66) form an external acute second pocket angle ($\alpha 2$).

30. The cutting tool (56) according to claim 29, wherein the tool plane (PT) intersects the at least one front major cutting edge (32).

31. The cutting tool (56) according to claim 27, wherein:
the cutting tool (56) is rotatable about a tool axis (AT) defining a forward-rearward direction ($D_F$, $D_R$), and
the first insert receiving pocket (60) opens out at a forward end surface (76) of the cutting body (58).

32. The cutting tool (56) according to claim 31, wherein:
the cutting tool (56) has a direction of rotation (R) about the tool axis (AT), and
the second support wall (66) faces the direction of rotation (R).

\* \* \* \* \*